(12) United States Patent
Morrill

(10) Patent No.: US 8,230,336 B2
(45) Date of Patent: Jul. 24, 2012

(54) EFFICIENT DISCOVERY, DISPLAY, AND AUTOCOMPLETION OF LINKS TO WIKI RESOURCES

(75) Inventor: Jason F. Morrill, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 329 days.

(21) Appl. No.: 12/428,350

(22) Filed: Apr. 22, 2009

(65) Prior Publication Data

US 2010/0275109 A1    Oct. 28, 2010

(51) Int. Cl.
*G06F 17/00* (2006.01)
(52) U.S. Cl. ........................................ 715/261; 715/205
(58) Field of Classification Search .................. 715/205
See application file for complete search history.

(56) References Cited

U.S. PATENT DOCUMENTS

| 6,751,603 | B1* | 6/2004 | Bauer et al. ........................... 1/1 |
| 6,820,075 | B2 | 11/2004 | Shanahan et al. ................. 707/3 |
| 7,185,271 | B2 | 2/2007 | Lee et al. ....................... 715/507 |
| 7,447,706 | B2 | 11/2008 | Chtcherbatchenko et al. .......................... 707/104.1 |
| 2006/0230032 | A1* | 10/2006 | Brankov et al. .................... 707/3 |
| 2006/0235984 | A1* | 10/2006 | Kraus et al. .................... 709/228 |
| 2007/0038978 | A1 | 2/2007 | Meijer et al. ................... 717/106 |
| 2007/0174247 | A1 | 7/2007 | Xu et al. ........................... 707/3 |
| 2007/0250531 | A1 | 10/2007 | Wiggins et al. ............... 707/102 |
| 2008/0002817 | A1 | 1/2008 | Ovsyannikov et al. ....... 379/200 |
| 2008/0294678 | A1 | 11/2008 | Gorman et al. ............... 707/102 |
| 2009/0006543 | A1 | 1/2009 | Smit ............................. 709/203 |
| 2009/0006953 | A1 | 1/2009 | Perantatos et al. ............ 715/700 |

OTHER PUBLICATIONS

Jim Buyens, Microsoft Office FrontPage 2003 Inside Out, 2004, Microsoft Press, pp. 4, 271, 272, 273, 275, 279.*
Duane K. Fields et at., IntelliJ IDEA In Action, 2006, Manning Publications Co. pp. 4, 82, 83, 84, 88.*
Rick Strahl, Creating Web Services with .Net and Visual Studio, Updated Mar. 7, 2002, pp. 1, 3, 4.*
Wiki Asp, Version 1.6.2 released Aug. 2006, pp. 4.*
Cooper, Ezra et al.; "Links: Web Programming Without Tiers;" University of Edinburgh; 2006; 30 pp.
Vehviläinen, Antti et al.; "A Semi-Automatic Semantic Annotation and Authoring Tool for a Library Help Desk Service;" Helsinki University of Technology; 2006; 9 pp.
Woelz, Carlos Leonhard; "Quanta as a Docbook Editor;" Licensed under the GNU Free Documentation License; downloaded from the Internet Feb. 11, 2009; 4 pp; URL: http://quanta.kdewebdev.org/tutorials/quanta-docbook/quanta.html.

(Continued)

*Primary Examiner* — Adam M Queler
*Assistant Examiner* — Howard Cortes
(74) *Attorney, Agent, or Firm* — Merchant & Gould P.C.

(57) ABSTRACT

An efficient system, and process, and user interface is provided for autocompletion of links within wiki page content. An indication is received that a user editing a wiki page desires to add a link to a resource. A user interface is provided to assist the user in autocompleting the insertion of the link into the wiki page. The user is provided with a list of both resource object types and options for each resource object type. The system is extensible in that new resource object types can be added to permit autocompletion of links to multiple resource types. A registration document is maintained by a wiki server that defines the resource object types that are available for autocompletion of links. The registration document contains contact information for providers that ultimately maintain the list of options for each of the resource object types.

17 Claims, 13 Drawing Sheets

OTHER PUBLICATIONS

Hyvönen, Eero et al.; "Semantic Autocompletion;" Semantic Computing Research Group (SeCo) et al.; 2006; pp. 1-13.
Horman, Jason et al.; wikidPad; downloaded from the Internet Apr. 22, 2009; 4 pp; URL: http://wikidpad.sourceforge.net/.
Oren, Eyal; SemperWiki: A Semantic Personal Wiki; 2005; 16 pp.
Laporte, Marc; Text Area Editing Helper; Jan. 17, 2009; 4 pp.
Buffa, Michel et al.; SweetWiki: Semantic WEb Enabled Technologies in Wiki; 2005; 15 pp.
Kiesel, Malte; Kaukolu: Hub of the Semantic Corporate Intranet; Germany; 2006; 12 pp.
No Author; "Syntax Auto Complete;" Sep. 17, 2008; 1 pp.

* cited by examiner

Super Villain Equipment

No super villain can be expected to work without the right tools. For example, every super villain should have a fully stocked secret lair. The first thing you need to acquire a top-notch [[⊢

[[⊢

Power Source
Dilithium Crystals
Aero Jet
Jet Silencer
Computer Mk IV
High Res Camera
Microphone Array
Body Armour

*Nuclear Power is generally the power source of choice for super villains due to its potential to support world domination . . .*

Doc:
Page:
WikiWorld:
List:
Pic:
Other:

Fig. 3A

Super Villain Equipment

No super villain can be expected to work without the right tools. For example, every super villain should have a fully stocked secret lair. The first thing you need to acquire a top-notch [[WikiWorld: Power Source]]

Fig. 3C

Super Villain Equipment

No super villain can be expected to work without the right tools. For example, every super villain should have a fully stocked secret lair. The first thing you need to acquire a top-notch [[Wikiworld: PowerSource]]. In addition, no secret lair would be complete without a state of the art [[Doc: Getaway Car]].

Fig. 3F

EFFICIENT DISCOVERY, DISPLAY, AND AUTOCOMPLETION OF LINKS TO WIKI RESOURCES

BACKGROUND

Wiki linking has become popular on the Internet and other networks. Wiki linking is an efficient method for creating links to resources. Generally, wiki links are created in a wiki editor to link the wiki page being edited to other resources, such as documents, images, web pages, other wiki pages, or other files. A wiki editor is generally a text editor implemented via a client browser to create and edit the content of a wiki page. Wiki pages are typically text-based and are hosted on a shared server, such as a web server.

Knowing what resources are valid targets for wikilinks can be difficult for users creating or editing wiki pages. Moreover, misspellings in attempting to create a wikilink can cause the wikilink to be inoperable. It is with respect to these and other considerations that embodiments of the present application are presented.

SUMMARY

In embodiments a method for providing autocompletion of a link to a resource in a wiki-editor user interface is provided. Text content is received for a wiki page via the wiki-editor user interface. In addition, an indication is received via the wiki-editor user interface that a user desires to link to a resource. A list of a plurality of resource object types available for linking from the wiki page is received and displayed. A selection of one of the resource object types is received, and a list of options for the selected resource object type is received and displayed. The options comprise different resources of the selected resource object type that are available for autocompletion of links from the wiki page. One of the options is selected, and a link to the selected option is then inserted into the content for the wiki page.

Further, in embodiments, a computer storage medium is provided that contains instructions that, when executed by at least one processing unit, perform a method. The method includes providing a registration document that includes at least a first registered resource object type and first contact information for a provider of the first registered resource object type. Registration of a second resource object type is then received. The registration includes contact information for a second provider of the second resource object type. The registration document is edited to include the second registered resource object type and contact information for the second provider. A request is then received from a wiki editor hosted by a client computer device for a list of registered object types. The list of registered object types sent to the client computing device includes both the first and second registered object types. A request is then received from the client device for a list of options for the second registered resource object type. The second provider is contacted using the second contact information and is requested to provide the list of options for the second registered resource object type. The client computing device is then sent link data for at least a selected option included in the list of options for the second registered object type.

In a further embodiment, a system is described for providing autocompletion of a link to a resource in a wiki-editor user interface. The system comprises at least one processing unit and memory. The memory includes instructions that cause the at least one processing unit to perform a method. The method includes receiving text content for a wiki page via the wiki-editor user interface. In addition, an indication is received via the wiki-editor user interface that a user desires to link to a resource. A list of a plurality of resource object types available for linking from the wiki page is received and displayed. A selection of one of the resource object types is received, and a list of options for the selected resource object types is received and displayed. The options comprise different resources of the selected resource object type that are available for linking from the wiki page. Input text is received, and a filtered list of options is acquired. The filtered list of options contains only options for the selected resource object type that include the input text. The filtered list of options is received, and one of the filtered list of options is selected. A link to the selected filtered option is then inserted into the text content for the wiki page.

These and other features and advantages will be apparent from a reading of the following detailed description and a review of the associated drawings. It is to be understood that both the foregoing general description and the following detailed description are explanatory only and are not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

FIG. 3A illustrates another exemplary user-interface layout according to embodiments disclosed herein.

FIG. 3C illustrates another exemplary user-interface layout according to embodiments disclosed herein.

FIG. 3F illustrates another exemplary user-interface layout according to embodiments disclosed herein.

DETAILED DESCRIPTION

Figure 1:
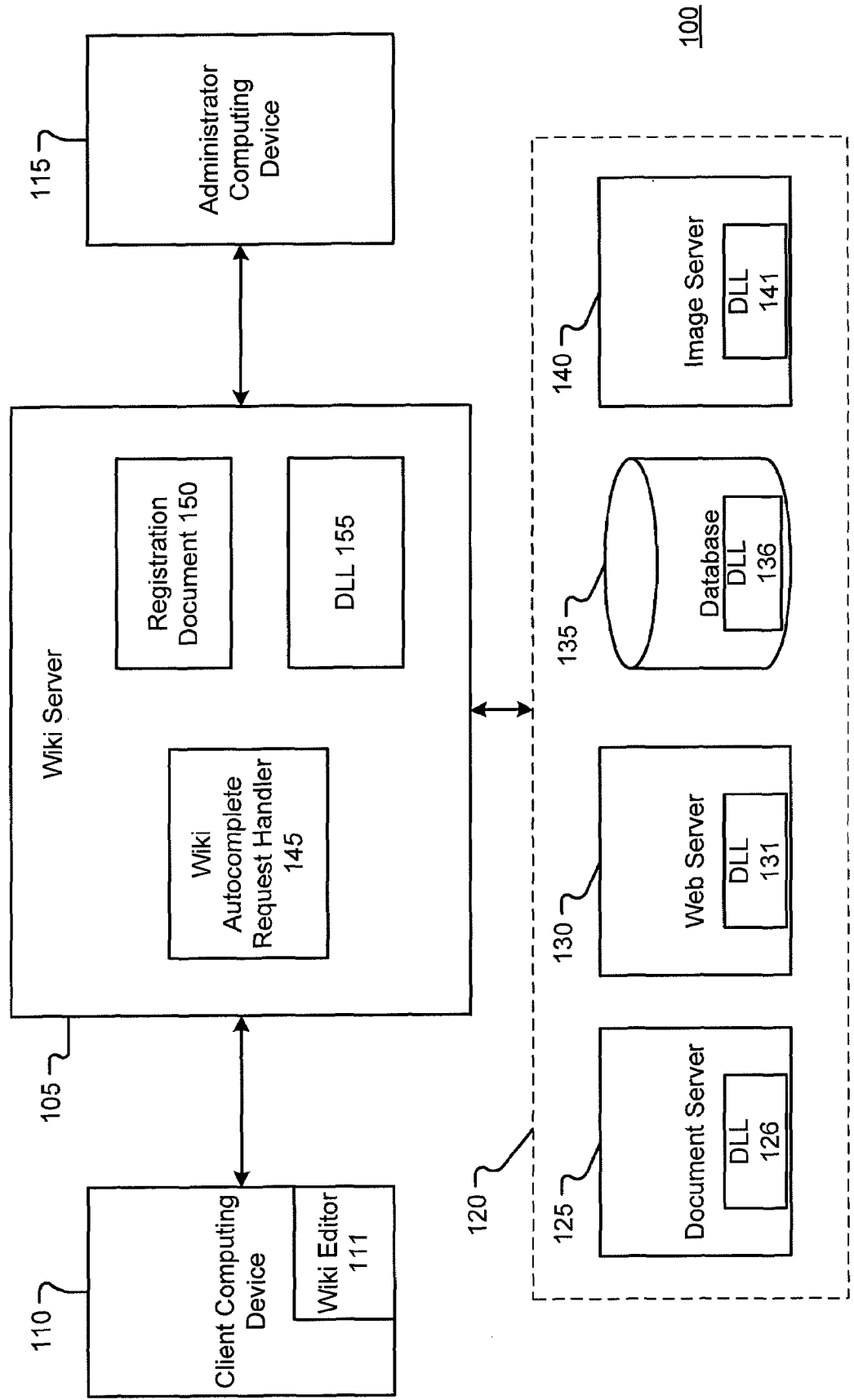
FIG. 1 is a block diagram illustrating an exemplary system for efficient discovery, display, and autocompletion of links to wiki resources according to embodiments disclosed herein.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

As briefly described above, embodiments disclosed herein are directed to the efficient discovery, display and autocompletion of links to wiki resources. A wiki server is provided that hosts a wiki page. The wiki server may comprise a server computing device adapted to act as a shared server that permits client computing devices to access and edit wiki page content. For example, the wiki server may comprise a server computing device that is running Office SharePoint Server, available from Microsoft Corporation of Redmond, Wash.

Wiki linking is an efficient method for creating links within wiki pages to resources. Generally, wiki links are created and inserted into the text of a wiki page using a wiki editor to link the wiki page being edited to other resources. A wiki editor is generally a text editor implemented via a client browser to create and edit the content of a wiki page. Wiki pages are typically text-based and are hosted on a shared server, such as a web server. The wiki server disclosed herein is adapted to permit client computing devices that host wiki editors (e.g., as part of a browser application) to discover, create, and autocomplete links to wiki resources. Wiki resources can include generally any data or programs that can be represented as a file or web page. For example, wiki resources can include documents, images, web pages, other wiki pages, or other files and media.

Generally, a user creating or editing a wiki page may desire to insert a link to a resource in the wiki page. The user indicates the desire to insert a link, for example, by typing certain link-initiating text (e.g., "[[") into the content of the wiki page, although other indications are possible. Once the indication is detected, the user interface of the wiki editor may present the user with the option to autocomplete the entry of the wiki link. This is advantageous because the user may not be aware of all resources available for linking and/or may not know how to properly enter the link due to misspellings, syntax, etc. In embodiments, a link text entry area is provided in the wiki-editor user interface, and the user may be provided with a menu of options for resources to which linking is available.

In order to extend resources available for linking in the wiki page and to enable efficient discovery and autocompletion of links to those resources, the present application supports multiple, extensible resource types for linking. The wiki server described herein may categorize and represent wiki resources as resource object types. For example, all text documents may be represented as a "Doc" resource object type, while all images may be represented as a "Pic" resource object type. The wiki server maintains a registration document that keeps track of all resource object types for which autocompletion of wiki links is supported. The registration document includes contact information for a provider that supports each resource object type. For example, the "Doc" resource type may be supported by a separate document server that maintains a dynamic-link library (DLL) and registers a SOAP service for all of the documents stored on the document server. The DLL may be updated continuously by the provider as documents are added or deleted. A different image server may act as a provider for the "Pic" resource object types, and the image server may maintain a DLL and register a SOAP service for all images stored on it. Resource object types may be added to the registration document in order to extend wiki link autocompletion to resources maintained by different providers.

When the user is provided with options for autocompletion of a wiki link, the user may also be provided with a list of the resource object types that are available for wiki linking. For example, a user may choose the "Pic" resource object type when desiring to enter a link for an image. The selection of the "Pic" resource object type causes the wiki server to access the registration document to obtain the contact information for the image server that acts as a provider for the "Pic" resource object type. The DLL maintained by the image server is then used to create a list of current options for the "Pic" resource object types (e.g., a list of all the images then available on the image server for linking). That list of options is then presented to the user for selection. Once the user selects an option, the link to that option is automatically completed and inserted into the content of the wiki page.

In embodiments, the lists of resource object types and options can be filtered based on input text entered by the user. For example, the user may narrow either list by typing in the first letter(s) of the resource object type or option and the list(s) will be automatically filtered to only entries that contain the input text. In addition, in some embodiments, the wiki server may determine that the number of available resource object types and/or options exceeds a certain threshold and may decline to provide the list of resource object types or options to the client computing device. In this case, the user may be prompted to begin entering input text until the list(s) can be filtered to below the threshold maximum for entries.

Referring now to the drawings, in which like numerals represent like elements through the several figures, aspects of disclosed embodiments and an exemplary operating environment will be described. FIG. 1 illustrates an embodiment of a system 100 for efficient discovery, display and autocompletion of links to wiki resources. System 100 includes a wiki server 105, operatively connected to a client computing device 110 (including wiki editor 111), an administrator computing device 115, and providers 120. As used herein, "operatively connected" includes any connection that permits different devices or systems to communicate with each other, whether directly or through intervening devices or systems. Providers 120 are operatively connected to the wiki server 105 and may also be operatively connected to client computing device 110 in order to permit client computing device to use wiki links created by the presently disclosed system to access resources stored or managed by the providers 120. Providers 120 include document server 125 (including DLL 126), web server 130 (including DLL 131), database 135 (including DLL 136), and image server 140 (including DLL 141). In addition, in embodiments discussed herein, wiki server 105 may be considered a provider if it hosts or stores resources that are registered for wiki linking. Wiki server 105 may also include a wiki autocomplete request handler 145, registration document 150, and DLL 155.

Computer systems described herein include, without limitation, a personal computer, server computer, hand-held or laptop device, microprocessor system, microprocessor-based system, programmable consumer electronics, network PCs, minicomputers, mainframe computer, smart card, telephone, mobile or cellular communication device, personal data assistant, distributed computing environment that includes any of the above systems or devices, and the like. Some computer systems described herein may comprise portable computing devices. Each computer system may also include one or more peripherals, including without limitation: keyboard, mouse, a camera, a web camera, a video camera, a display device such as a monitor, a microphone, or speakers. The term "computer system" is used herein interchangeably with "device."

Each computer system includes an operating system, such as (without limitation) the Windows operating system from Microsoft Corporation of Redmond, Wash., and one or more programs (such as named wiki autocomplete request handler 145, wiki editor 111, etc.) stored on the computer readable media. Each computer system may also include one or more input and output communications devices that allow the user to communicate with the computer system, as well as allow the computer system to communicate with other devices. Communications between and among the computer systems of FIG. 1 (e.g., client computing device 110, wiki server 105, administrator computing device 115, document server 125, web server 130, database 135 and image server 140) can be implemented using any type of communications link, including, without limitation, the Internet, wide area networks, intranets, Ethernets, direct-wired paths, satellites, infrared scans, Bluetooth, cellular communications, or any other type of wired or wireless communications.

Embodiments of the present application will now be described with respect to the system 100. Client computing device 110 includes a wiki editor 111. The wiki editor 111 comprises an application that may be implemented as a part of a network browser application. Wiki editor 111 is generally a text editor that permits a user to create and edit content of a wiki page. While receiving content for the web page, the wiki editor 111 receives an indication through a user interface that the user desires to add a link to a resource. For example, while entering text for the wiki page, the user may enter link-initiating text (such as "[[") that indicates a desire to insert a link to a resource. Other indications of a desire to enter a link are possible. Upon receiving the indication, the wiki editor generates additional user-interface elements to facilitate autocompletion of the link creation.

Figure 2:
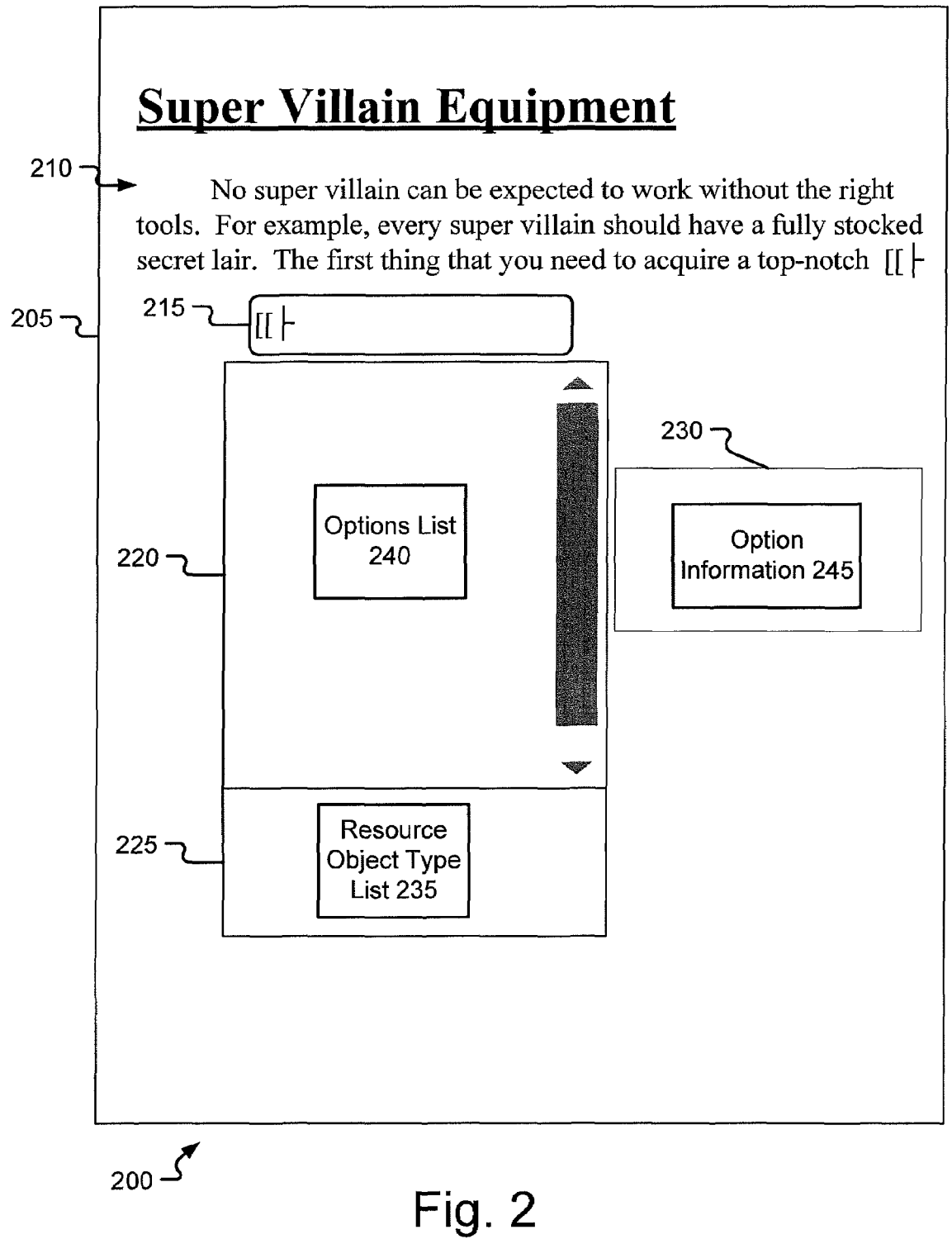
FIG. 2 illustrates an exemplary user-interface layout according to embodiments disclosed herein.

Referring to FIG. 2, an example of the format of a user interface 200 for a wiki editor (such as wiki editor 111) is illustrated. Wiki-editor user interface 200 includes a wiki content entry area 205, which permits a user to enter content 210. In this example, the user has entered text content 210 including information about "Super Villain Equipment." In this example, when the user types "[[", the wiki editor 111 interprets those particular keystrokes as an indication that the user desires to insert a link to a resource. Accordingly, the wiki editor 111 generates a link text entry area 215, an option display area 220, and a resource type display area 225. In embodiments, when an option is selected in the option display area 220, the wiki editor 111 may also generate an option information display area 230.

Resource type display area 225 displays a list 235 of the types of resource objects that are available for autocompletion. In embodiments, one of the types of resource objects listed in the resource type display area 225 is for a resource type that is not available for autocompletion. In this embodiment, the user is prompted to enter the link information manually in link text entry area 215 or directly in content entry area 205. When a resource object type that is available for autocompletion is selected in the resource object type list 235, an options list 240 is displayed in option display area 220. Options list 240 includes names of resources of the selected resource object type for which a link can be autocompleted. Upon selection of an option in the options list 240, information, such as a text description of the selected option, can be displayed in option information display area 230. Upon further selection, a link for the selected option is automatically inserted into the text content 210 and link text area 215, option display area 220, resource type display area 225, and option information display area 230 may disappear.

For example, the user may use up and down arrows on a keyboard connected to the client computing device to intermediately select an option within options list 240, resulting in information 245 being displayed. Another selection (e.g., pressing the "Tab" key, mouse click, etc.) may be used to cause the link to the selected option to be inserted into the text content 210. Other input mechanisms and indications are possible. When an autocompleted link is inserted into text content 210, it can be displayed as a hypertext link or continue to be displayed as plain text (e.g., an unresolved URL, identifier of the provider and option name, or other syntax) until the web page is saved and it is converted to a hypertext link.

Referring back to FIG. 1, generation of the options list and resource object type list, and autocompletion of the desired wiki link is discussed in further detail. When the wiki editor 111 detects an indication that the user desires to insert a wiki link, the client computing device requests information about potential links from wiki server 105. In embodiments, wiki server 105 hosts the wiki page that is being edited or created by the wiki editor 111. The wiki server 105 includes a wiki autocomplete request handler 145 that manages and responds to requests from wiki editor 111 for information about potential links. The handler 145 receives the request from wiki editor 111 and accesses registration document 150.

The request from wiki editor 111 may include a specific resource object type for which information is sought. For example, wiki editor 111 may keep track of the last type of resource object for which an autocompleted link was generated and use that as a default for an initial request. In other embodiments, handler 145 may make a default selection (e.g., the first resource object type listed in the registration document 150, the most-often requested resource object type, etc.). If a default resource object type is selected (or a specific resource object type has been requested by wiki editor 111), the handler will obtain and return a list of valid options for resources of that type for which autocompletion of wiki linking is available. In other embodiments, no resource object type is selected (either directly or through default), and the handler requests the wiki editor to prompt the user to select a resource object type. For example, the user may be presented with the resource object type list 235 in FIG. 2 while the options list 240 is left blank until a resource object type is selected.

Once a resource object type is selected (directly or by default), the object handler 145 access the registration document 150. Registration document 150 may comprise an extensible markup language (XML) document that includes a list of all resource object types that have been registered for autocompletion. For each registered resource object type, the registration document 150 also includes contact information for a provider 120 associated with that resource object type.

For example, the "Doc" resource type may be supported by a separate document server 125 that maintains a DLL 126 for all of the text documents stored on the document server. The DLL 126 may be updated continuously by the document server 125 as documents are added or deleted. Other implementations of allowing the web server 105 and providers 120 to communicate are possible. For example, the registration document may also identify a SOAP service for the document server 125 that will handle queries to the DLL 126 from handler 145. In embodiments, DLL 155 may also included executable code for communicating with providers 120. In other embodiments, such code is unnecessary. Use of SOAP service(s) or other communication and data-access mechanisms may eliminate the need for specific code running on the web server and/or for DLL's 155, 126, 131, 136, or 141. Because the registration document 150 includes contact information for the document server 125, wiki server 105 need not maintain a master list of resources for the "Doc" resource object type in order to provide autocompletion services to wiki editor 111. Rather, when a request for a list of options for the "Doc" resource object type is received by handler 145, wiki server 105 uses the contact information in registration document 150 to request the list of options from document server 125. Registration document 150, in embodiments, may be stored and maintained somewhere other than wiki server 105 as long as wiki server 105 has access to it.

The list of resource object types supported for autocompletion is extensible. A different server may act as a provider other resource object types. For example, web server 130 may maintain a DLL 131 for "WikiWorld" object types, where WikiWorld is a collection of wiki pages hosted by web server 130. Similarly, database 135 may maintain a DLL 136 for "List" resource object types, where the "List" resource object type represents list item resources stored in database 135. In addition, "Pic" resource object types may be maintained by image server 140, which maintains a DLL for all images stored on it. Providers and resource object types may be added to the registration document 150 in order to extend wiki link autocompletion to resources maintained by different providers. For example, an administrator operating administrator computing device 115 may add a new resource object type to registration document 150 by including the name of the resource object type and contact information for the provider. In embodiments, providers 120 comprise a SOAP service that can handle queries from wiki server 105 and obtain the necessary information from the DLL of the provider 120; the contact information for each provider 120 in registration document 150 includes information identifying the SOAP service for that provider. In addition, wiki server 105 may act as its own provider (e.g., for a "Page" resource object type) by maintaining a DLL 155 for other wiki pages hosted by wiki server 105 (such as other pages in the same wiki collection as the page being edited by wiki editor 111). In this manner, the number and type of resource object types that are available for wiki link autocompletion can be dramatically increased without requiring wiki server 105 to maintain a master list of all resources available for autocompletion of wiki links.

When the list of options is received by handler 145, the list of options and an updated list of resource object types are returned to wiki editor 111. In addition, handler 145 may receive a description of the options in the list of options (e.g., a text description of a document or web page, a thumbnail image of an image option, etc.). These descriptions may be sent to the wiki editor 111 with the options list or may be requested by handler 145 from provider 120 only upon request from wiki editor 111. For example, wiki editor 111 may permit an intermediate selection by a user of an option in the displayed option list. Such intermediate selection (by hovering the mouse pointer, highlighting the option, or otherwise), may not cause the link to be autocompleted, but may result in an information display area (such as option information display area 230 in FIG. 2) being displayed. Such information display area may display such option description information 245 obtained from a provider 120.

In addition, handler 145 may receive link information for each option from a provider 120. Link information may include a URL for the resource described by the option. The link information can be included when the provider 120 returns an option list for a particular resource object type to handler 145. Alternatively, provider 120 can provide to handler 145 such link information only upon request. Similarly, in embodiments, the link information is provided by handler 145 to wiki editor 111 along with the list of options. Alternatively, handler 145 returns link information that can be used to create a hyperlink for the option only upon user selection of a particular option and a request by wiki editor 111.

In embodiments, the registration document 150 may include contact information for more than one provider for a single resource object type. For example, two different providers may include images that can be linked to. In this case, the two different providers may each provide a list of options when requested, and handler 145 may merge the two lists and eliminate duplicates before sending a combined list of options to the wiki editor 111.

With reference again to FIGS. 1 and 2, when the wiki editor 111 displays the options list 240 and resource object type list 235 to the user, the user may desire to filter one or both lists by entering input text. For example, the user may enter the first letter(s) of the option or resource object type of interest in the link text entry area 215. This causes both lists 235 and 240 to be filtered to only those options or resource object types that contain (or start with) the input text. In embodiments, filtering of the lists 235 and/or 240 can be performed locally by client computing device 110, or by wiki server 105 and/or by providers 120.

For example, if the user enters "D" in link text entry area 215 prior to a particular resource object type being selected, wiki editor 111 may make a request to the handler 145 to return a filtered list of options and resource object types starting with the letter "D." Handler 145 may narrow the list of resource object types listed in the registration document 150 to the "Doc" resource object type. The handler 145 may then request a list of options that start with the letter "D" from document server 125. In embodiments, once a resource object type is definitively selected (e.g., by highlighting and selecting the particular resource object type in the resource object type list 235), filtering based on subsequently entered text may affect only the options listed.

In embodiments, handler 145 may determine that a query for resource object types or options contains more than a threshold number of candidates. For example, an administrator may set a threshold number of options that can be returned to wiki editor 111 for any particular resource object type. The threshold may be set based on the number of entries that a user could practically be presented with to still be useful. If the number of options returned by a provider 120 is above the threshold (or if the provider 120 indicates that it would be above the threshold), the handler 145 may instruct the wiki editor to inform the user that input text must be entered in order to narrow the list of options. Similarly, a separate threshold may be set for resource object types such that if the registration document 150 becomes too long to display all of the resource object types to a user; input text to narrow the list of resource object types 235 may then be required.

In addition, autocompletion and filtering may be limited in other ways. For example, rather than instituting a filtering operation immediately upon the entry of input text, the wiki editor 111 may wait to detect an indication that autocompletion and/or filtering is desired. For example, prior to displaying link text area 215, option display area 220 or resource type display area 225 in wiki editor user interface 200, the wiki editor 111 may wait until a pause in the user's text entry occurs. If the user, for example, typed "[[" in wiki content entry area, the wiki editor 111 may wait a set amount of time to determine if the user wishes simply to enter the link manually. Similarly, once the link text entry 215 is displayed and the user is entering text into the link text entry area 215, wiki editor 111 may wait to detect a pause in entry of input text before initiating filtering of the options and/or resource object types based on the input text. Similarly, autocompletion and/or filtering can be delayed until the user has entered a certain threshold number of characters after entering the link-initiating text. This limits unnecessary requests to the wiki server 105.

Figure 3B:
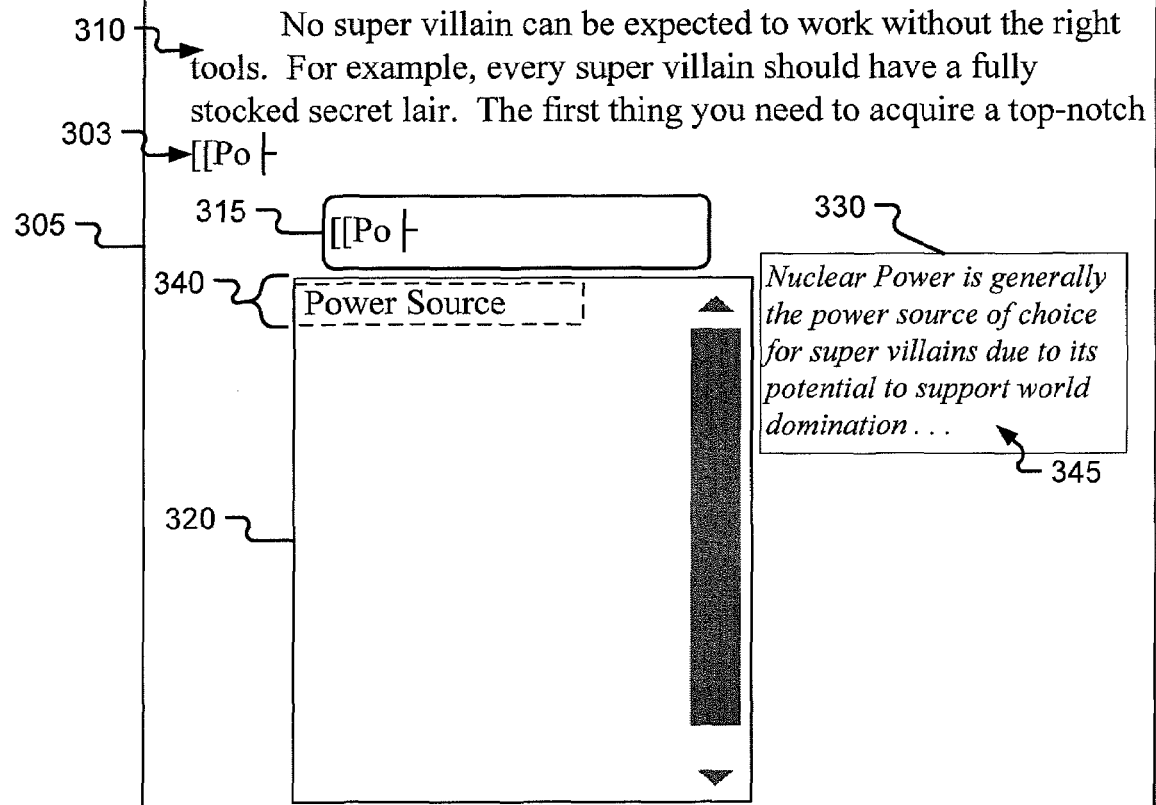
FIG. 3B illustrates another exemplary user-interface layout according to embodiments disclosed herein.
Figure 3D:
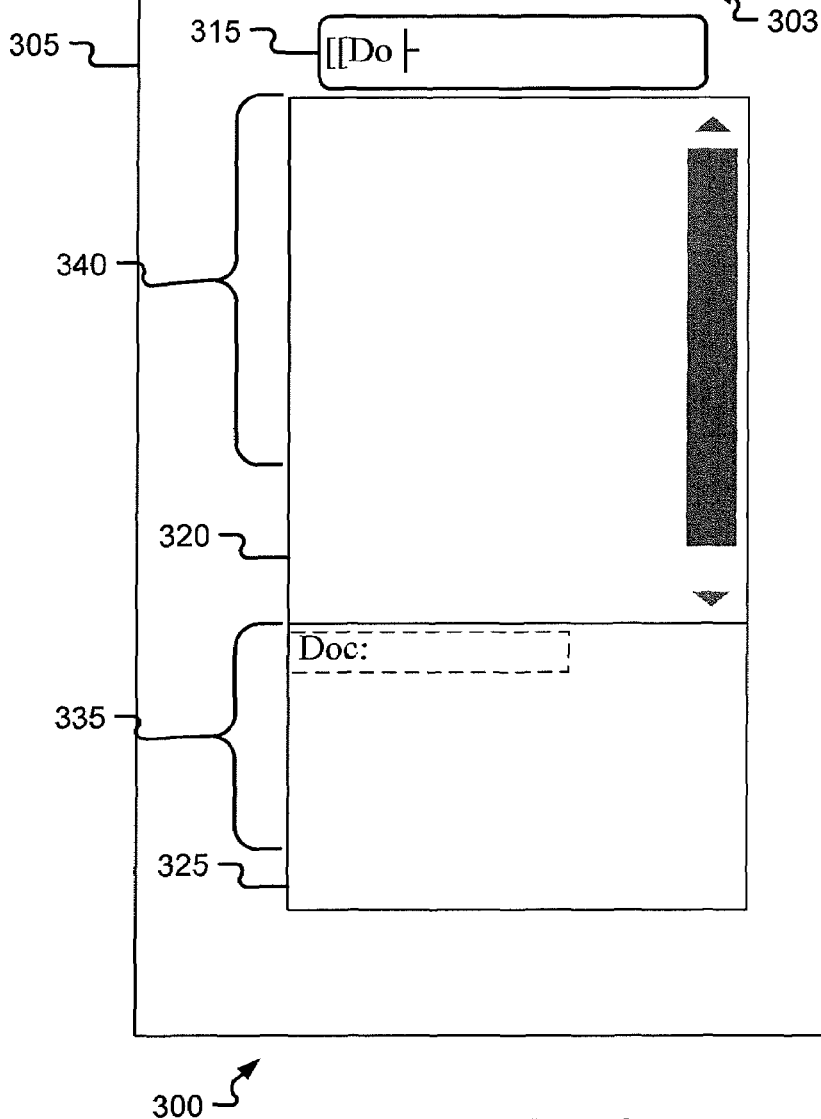
FIG. 3D illustrates another exemplary user-interface layout according to embodiments disclosed herein.

Referring now to FIGS. 3A-F, exemplary illustrations of a wiki-editor user interface 300 are shown at various stages following a sequence of events. In embodiments, wiki-editor user interface 300 can be provided as part of a browser user interface. FIG. 3A illustrates wiki-editor user interface after a user has entered link-initiating text 303 (in this case, "[[") in wiki content entry area 305. In this example, while the user was entering text content 310 in wiki content entry area 305, the user entered the link-initiating text 303, which caused link text entry area 315 to pop up. In other embodiments, the link-initiating text entry area 315 comprises an area within content entry area 305 that is in-line with the content 310 being entered (e.g., a "box" or other demarcation could simply be drawn around the link-initiating text 303 and the cursor such that no separate "popup" area is necessary). The link-initiating text 303 is displayed in the link text entry area 315. In addition, option display area 320 and resource type display area 325 are initiated and displayed. In this example, the resource object type "WikiWorld" is selected as a default in resource object type list 335. Accordingly, options for the "WikiWorld" resource object type are displayed in options list 340. In addition, the "Power Source" option is selected as a default in options list 340, and a page description (option description information) 345 for the "Power Source" option is displayed in option information display area 330.

Referring to FIG. 3B, the user has entered input text of "Po" in link text entry area 315. Because there was only one entry in options list 340 that starts with "Po," the options list 340 is narrowed to the single "Power Source" entry. In addition, because the resource object type list 335 does not contain any entries that start with "Po," the resource type display area 325 shown in FIG. 3A has disappeared. In other embodiments, resource type display area 325 remains, but is blank. If the user were to delete the input text "Po," the wiki editor user interface 300 would revert back to what is displayed in FIG. 3A.

In FIG. 3C, the user has selected the "Power Source" option displayed in FIG. 3B, and a wiki link 360 for "WikiWorld: Power Source," has been created and entered into the text content 310. The option display area 320, option information display area 345, and resource type display area 325 shown in FIG. 3B all disappear until the link-initiating text is again detected as being entered into wiki content entry area 305. "WikiWorld" is added as a designator to the link 360 because the "Power Source" option was displayed as a "WikiWorld" resource object type. In embodiments, the link 360 can be displayed in different ways.

For example, while the page is being edited, the link 360 can be displayed in text, such as "[[WikiWorld: Power Source]]" (as shown) or as an unresolved URL, etc. When the wiki page and wiki text content 310 are then saved to wiki server 105, the wiki editor 111 or wiki server 105 can convert the text version of the link 360 to a hypertext link to the resource represented by the link 360. This can be accomplished by creating a hypertext link from link information (e.g., a URL for the resource) received previously or obtained upon request from wiki server 105 or providers 120. Alternatively, the hypertext link may be created and inserted into wiki content entry area 305 while the wiki content 310 is still being edited. In addition, in embodiments, the user may designate a display name for the link 160. For example, the user may insert "|display name" after the link to designate that the display name should be used when creating the hyperlink. After the link 360 is inserted, the user may continue to enter text content into wiki content entry area 305.

In FIG. 3D, the user has again entered link-initiating text 303 ("[[") in wiki content entry area 305 and was presented with the wiki-editor user interface 300 illustrated in FIG. 3A. This time, however, the user has entered input text of "Do." Because there is only one resource object type that starts with "Do," the resource object type list 335 is narrowed to one entry: "Doc." In addition, options list 340 is blank because none of the previously displayed options start with "Do." If the user now selects the "Doc" resource object type, the options list 340 will be populated with options for that resource object type. The user can select the "Doc" resource object type in several different manners (pressing "Tab" or "Enter" on the user's keyboard, mouse click, etc.).

Figure 3E:
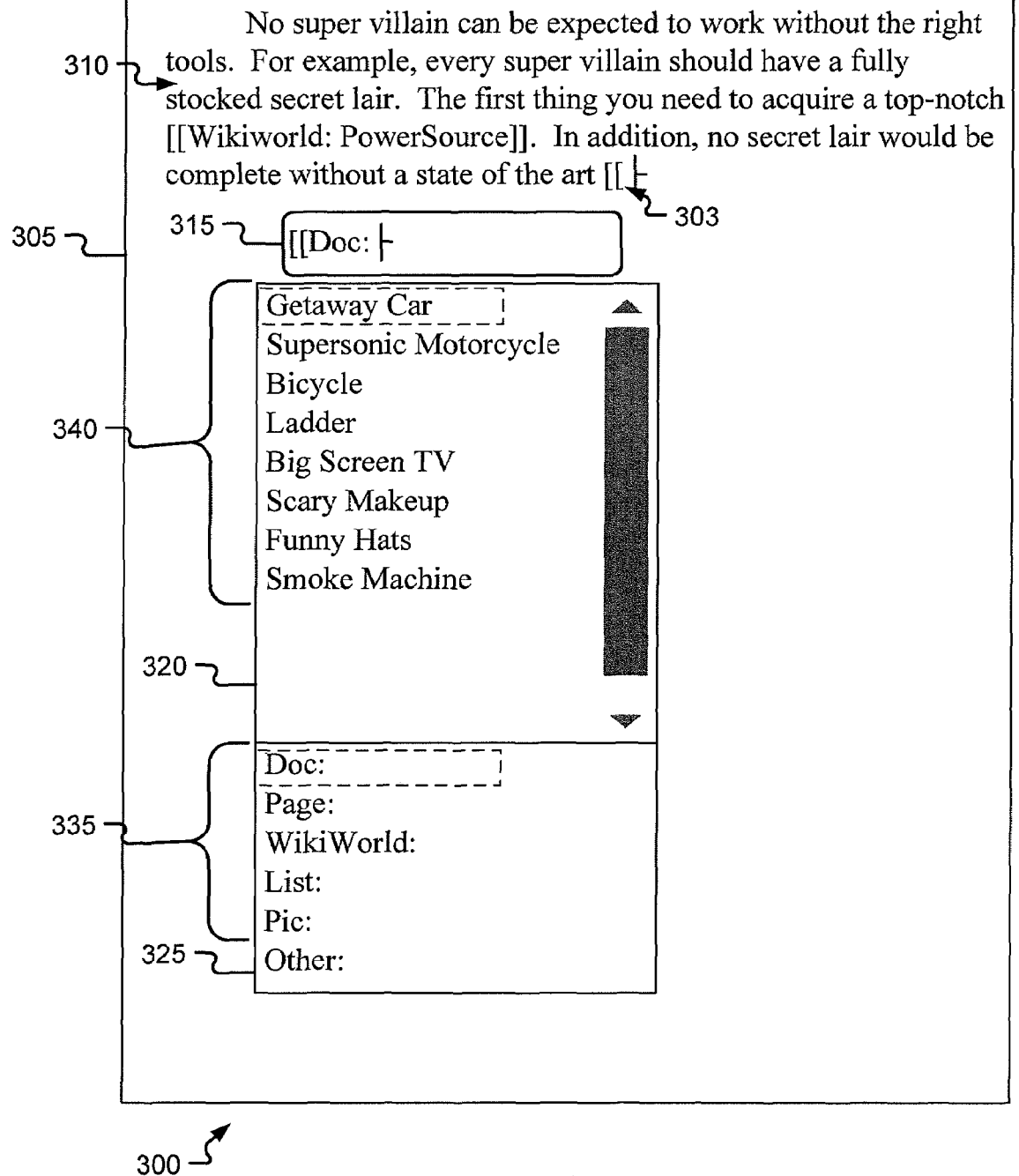
FIG. 3E illustrates another exemplary user-interface layout according to embodiments disclosed herein.

In FIG. 3E, the user has selected the "Doc" resource type. The options list 340 is now populated with options retrieved from the provider for the "Doc" resource object type. In addition, the full resource object type is automatically entered into the link text entry area 315. At this point, the user can either select one of the options in options list 340 or continue typing in link text entry area 315 to narrow the options list 340. In addition, in this example, although the "Doc" resource object type is shown as selected and highlighted in the resource object type list 335, and the other resource object types are redisplayed in list 335. In this manner, the user is provided the option to select a different resource object type from list 335 without having to delete the "Doc:" entry from the link text entry area 315. In other embodiments, the "Doc" resource object type is the only one shown unless and until the "Doc:" entry is deleted by the user from link text entry area 315. In this embodiment, the option information display area is not displayed.

In FIG. 3F, the user has selected the "Getaway Car" option from the option list in FIG. 3E, and a link 370 has been automatically generated and inserted into the content 310 in wiki content entry area 305. Again, the option display area 320, option information display area 345, and resource type display area 325 all disappear until the link-initiating text is again detected as being entered into wiki content entry area 305. "Doc" is added as a designator to the link 370 because the "Getaway Car" option was displayed as a "Doc" resource object type.

Figure 4A:
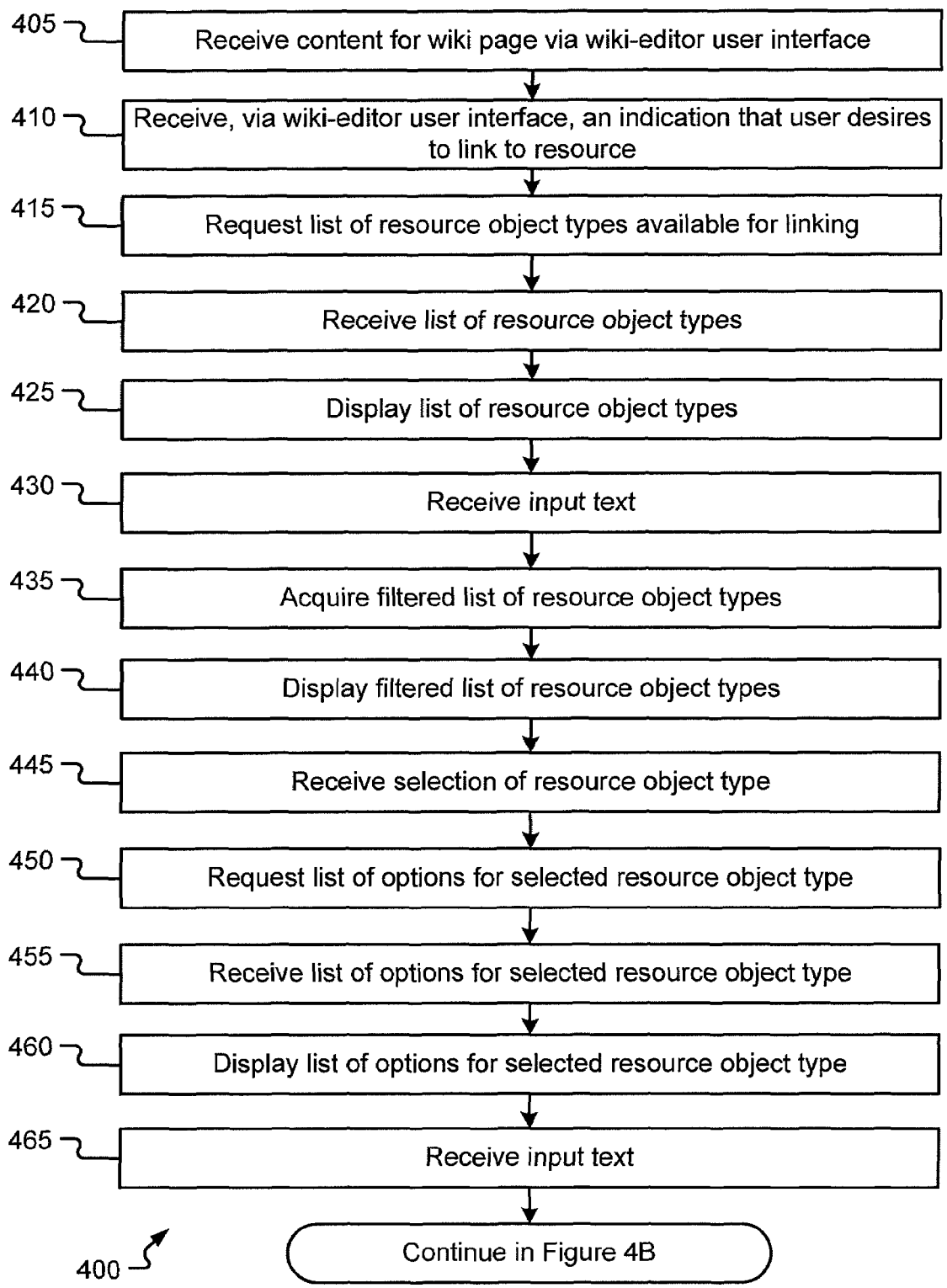
FIGS. 4A and 4B illustrate an exemplary process for autocompletion of a link to a resource in a wiki-editor user interface according to embodiments disclosed herein.
Figure 4B:
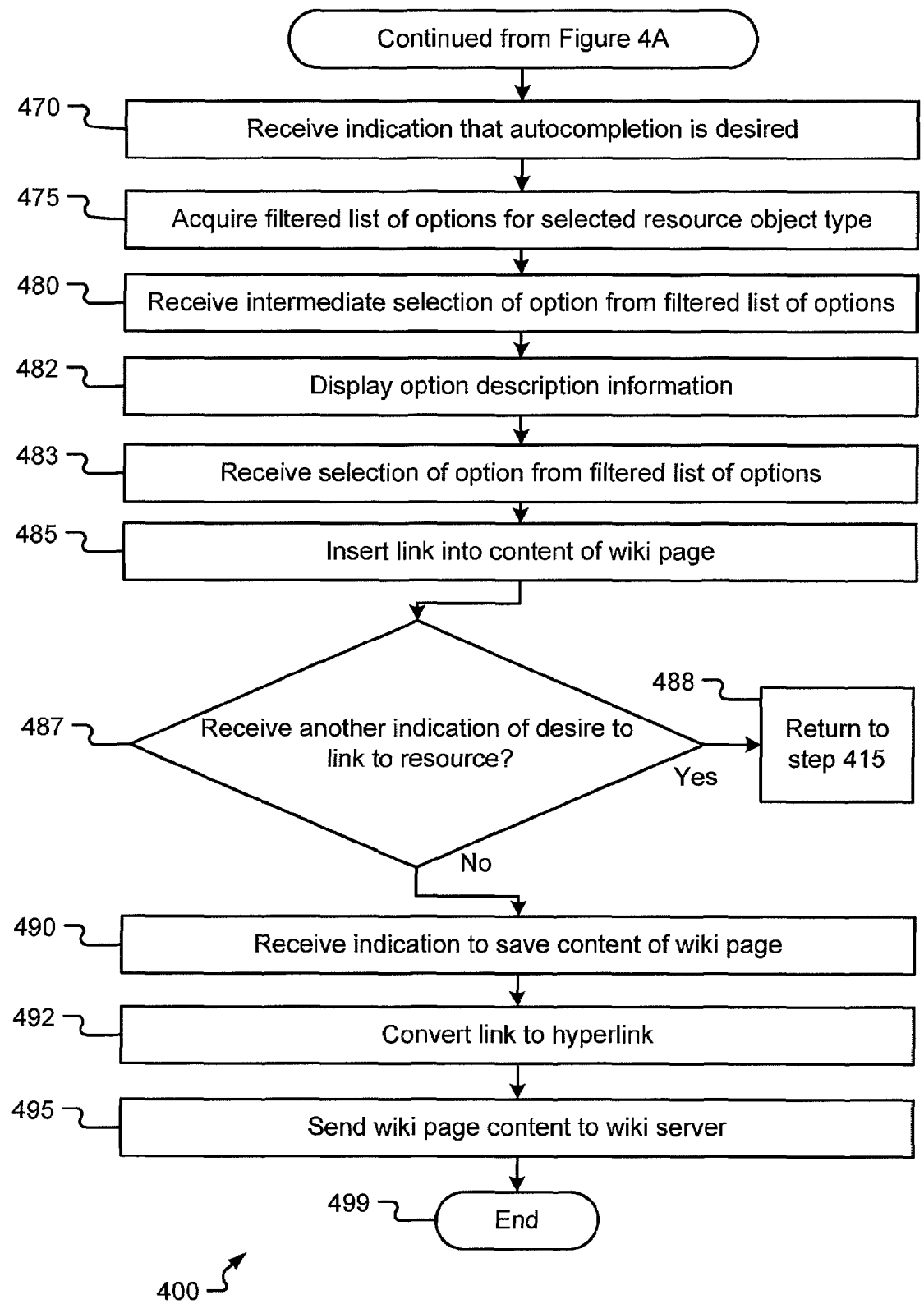

Referring now to FIGS. 4A and 4B, an exemplary method 400 for autocompletion of a link to a resource in a wiki-editor user interface is described. The exemplary method 400 of FIG. 4 may, in embodiments, be accomplished by the system described with respect to FIG. 1 and the user-interface elements discussed with respect to FIGS. 2 and 3A-F. In step 405, content is received for a wiki page in a wiki-editor user interface. For example, a user may enter text to be included in a wiki page through a wiki content entry area such as area 305 in FIG. 3A. An indication is then received 410 that a user desires to link to a resource. As discussed, the indication can comprise link-initiating text, such as a particular set of keystrokes detected when the user is entering content for the wiki page. In other embodiments, the indication may be received in alternative manners, such as the user clicking on a displayed icon.

At step 415, a list of resource object types available for linking is requested. For example, a wiki editor operating on a client machine may request that a wiki server return the current list of resource object types for which autocompletion of a link is available. In embodiments, step 415 is not performed unless and until an indication is received that the user desires autocompletion of the link. For example, if the user pauses after entering link-initiating text, the list of resource object types is requested. The list of resource object types is received at step 420 and displayed 425. In embodiments, input text may be received 430. For example, the user may begin to enter the name of a particular resource object type.

Once input text is received 430, a filtered list of resource object types is acquired. Acquisition of the filtered list of resource object types can be accomplished locally by the client machine hosting the wiki editor or can be requested from a wiki server. For example, the wiki editor may be programmed to filter the list itself. In other embodiments, the filtering is done by the wiki server and the filtered list is returned to the client machine. Once acquired, the filtered list of resource object types is displayed 440.

A selection of the resource object type is received 445. In embodiments, the resource object type may be selected without filtering the list of resource object types. For example, a user may select a resource object type directly after the list is displayed at step 425. In addition, in embodiments, the selection of the resource object type is made automatically. For example, when the user first indicates a desire to link to a resource, in embodiments a default resource object type is selected so that a list of options for that selected resource object type can be displayed.

At step 450, a request is made for a list of options for the selected resource object type. In embodiments, the request 450 can be made at the same time as the request 415 for the list of resource object types. For example, as discussed above, when a user first indicates a desire to link to a resource, if a default resource object type is selected, the wiki editor may request that the wiki server send the list of resource object types and the list of options for the default resource object type. If the user then selects a different resource object type, a new list of options for the selected resource object type can be requested.

At step 455, the list of options for the selected resource object type is received, and the list is then displayed 460. At step 465, input text is received. As discussed, input text can be used to narrow the options list. The method 400 then continues at FIG. 4B.

In step 470, an indication is received that autocompletion is desired. In embodiments, this can comprise a pause by the user in entering the input text. In other embodiments, this can comprise receiving a set number of characters of input text. Once the indication is received that autocompletion is desired, a filtered list of options is acquired 475. The filtered list may comprise only options for the selected resource object type that contain or start with the input text received at step 465. Again, in embodiments, the filtering of the list of resource object types can be accomplished locally by the client machine hosting the wiki editor, by a wiki server, or otherwise.

At step 480, an intermediate selection is received from the filtered list of options. In embodiments, a user will indicate interest in an option before finally selecting an option. In embodiments, an intermediate selection can be made in a variety of ways. For example, the user may highlight the option using the up/down arrows on a keyboard before taking another action to finally select the option; or the user may click once on a selection before double-clicking to finally select the option. If an intermediate selection is received 480, option description information may be displayed 482. For example, a user-interface element, such as option information display area 345 in FIG. 3A, may be displayed with information describing the option that has been intermediately selected. This option description information may make it easier for a user to make a final decision about what option to finally select.

At step 483, the selection of an option is received. For example, when the user finally decides which resource the user desires to link to, the user will input that selection. After the selection of the option in step 483, a link is inserted 485 in the content of the wiki page. As discussed, while the content of the wiki page is still being edited, in embodiments, the link may be displayed only in text form. For example, the link may be expressed in the content of the wiki page as an unresolved URL, by a phrase in the form "[[resource object name: option]]," or otherwise. The text form of the link can then be converted into a hypertext link (e.g., by resolving the unresolved URL, mapping the text link to a URL using link data supplied by the wiki server or provider, etc.). In other embodiments, the link is inserted as a hyperlink even while the wiki page is still being edited.

After the link is inserted at step 485, a determination is made 487 whether another indication has been received of a desire to link to a resource. For example, it may be detected that a user has continued to add content to the wiki page and has again entered link-initiating text. If so, the process returns 488 to step 415. If not, the process continues to step 490, where an indication to save the content of the wiki page is received.

Upon receiving 490 an indication to save the content of the wiki page, if the link entered in the content of the wiki page is still in text form, it is converted 492 to a hyperlink. As discussed, this can be accomplished in embodiments by the client machine hosting the wiki editor by obtaining link information from the wiki server. In other embodiments, the conversion of the link to a hyperlink can be performed by the wiki server. At step 495, the content of the wiki page (including the inserted link(s)) is sent to the wiki server to be saved, and the process ends 499.

Figure 5A:
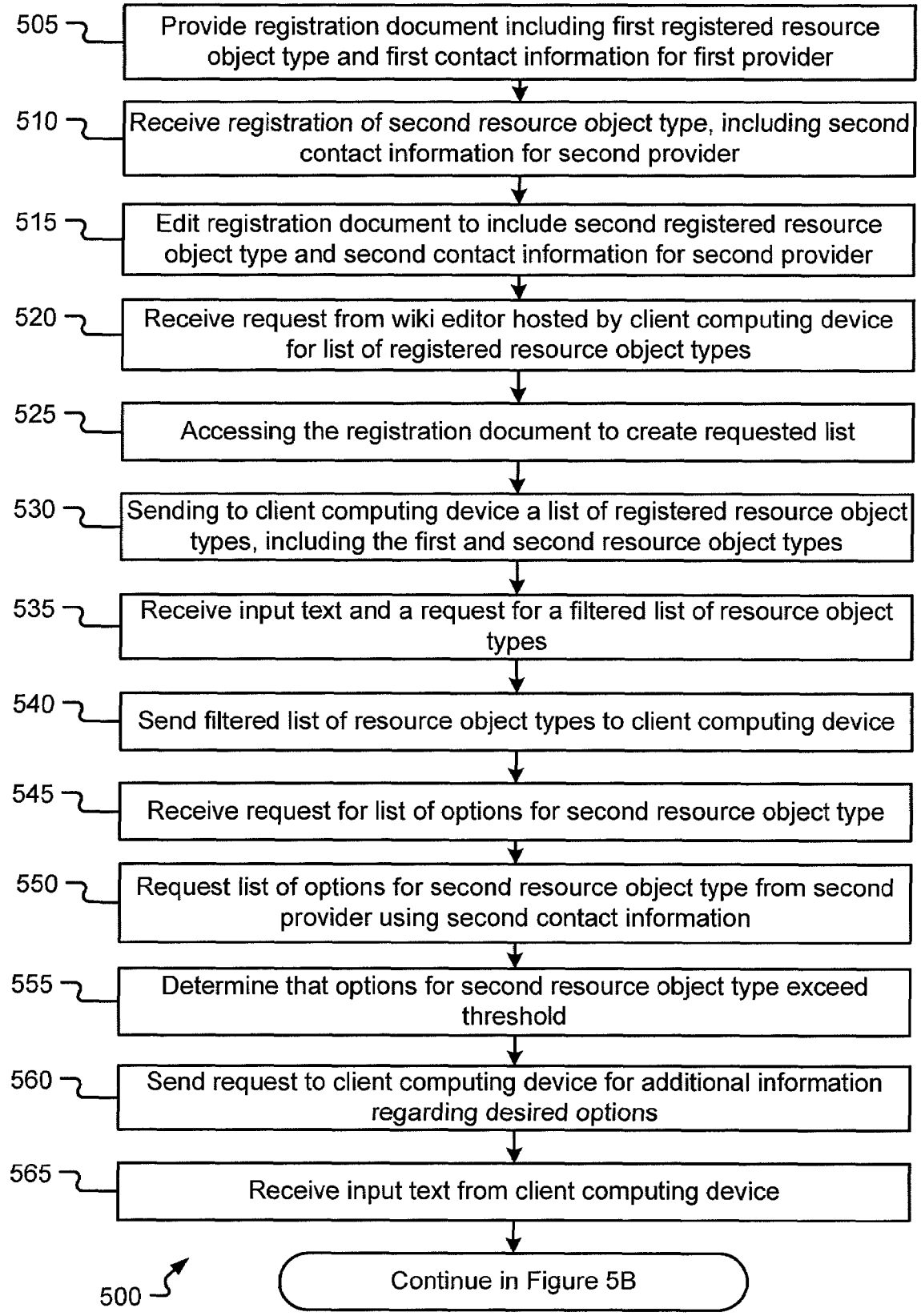
FIGS. 5A and 5B illustrate an exemplary process for obtaining and providing information needed for autocompletion of a link to a resource in a wiki-editor user interface according to embodiments disclosed herein.
Figure 5B:
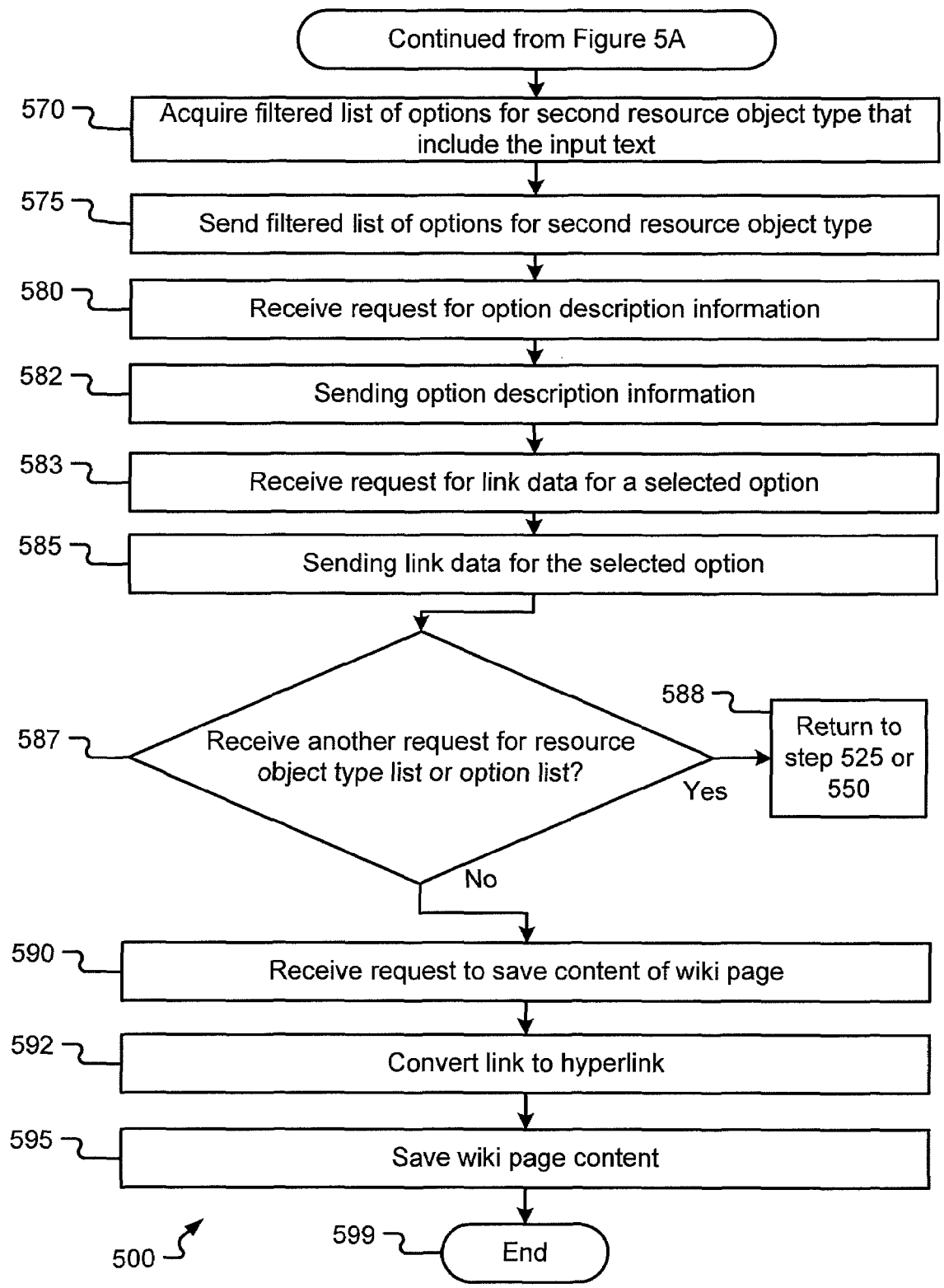

Referring now to FIGS. 5A and 5B, a method 500 is illustrated for obtaining and providing information needed for autocompletion of a link to a resource in a wiki-editor user interface. The exemplary method 500 of FIG. 5 may, in embodiments, be accomplished by the system described with respect to FIG. 1 and the user-interface elements discussed with respect to FIGS. 2 and 3A-3F.

At step 505, a registration document is provided, including a first registered resource object type and first contact information for a first provider. As discussed, the registration document may comprise an XML document that tracks all registered resource object types available for autocompletion of a wiki link. In addition to the name of the registered resource types, the registration document includes information on how to contact the provider of that resource object type. For example, the registration document may include contact information that describes a SOAP service that can be queried to determine options and other information relating to the resource object type.

At step 510, a registration of a second resource object type is received. An administrator or third party may, for example, wish to extend the type of resources for which autocompletion is available for a link from a wiki page. The second resource object may be added by including with the registration contact information for the provider of the second resource object type.

The registration document is edited 515 to reflect the addition of the second resource object type and second contact information for the second provider. In this manner, when requests for a list of available resource object types are received, the second resource object type will now be included.

At step 520, a request from a wiki editor hosted on a client computing device is received asking for a list of registered resource object types. The current list is derived by accessing 525 the now-edited registration document. A list of resource object types, including the both the first and second resource object types, is sent 530 to the client computing device.

In embodiments, input text is received 535 along with a request for a filtered list of resource object types. For example, the user at the client computing device may desire to narrow the list of resource object types by entering as input data the first letter(s) of a resource object type. In embodiments, the filtering of the list of resource object types is performed at the client computing device. In other embodiments, the filtering is performed by the wiki server. At step 540, a filtered list of resource object types is sent to the client computing device.

A request is received at step 545 for a list of options for the second resource object type. In response, a request for the list of options for the second resource object type is sent to the second provider using the second contact information. For example, a wiki server may access the registration document to determine the appropriate method and address to contact the second provider and send a request accordingly.

Next, it is determined in this exemplary embodiment, that the number of options for the second resource object type exceeds a threshold. The threshold can be set, for example, to ensure that the user receives a list for autocompletion only if the list is not so large as to be practically unusable. The determination can take place in multiple ways. For example, the wiki server can receive the full list from the provider and determine that it is too large. Alternatively, the provider can determine that the number of options in the list exceeds the threshold and send an indication to that effect to the wiki server. In this sense, the wiki server still determines that the options for the requested resource object type exceeds the threshold.

In response, a request is sent 560 to the client computing device for additional information regarding desired options. For example, the client computing device may be directed to prompt the user to start entering input text, e.g., the first letters of a desired option. In this embodiment, input text is then received 565 from the client computing device. The method 500 continues in FIG. 5B.

At step 570, the input text is used to acquire a filtered list of options for the second resource object type that include the input text. If the filtered list includes less than the threshold number of options, the filtered list of options for the second resource object type is sent 575 to the client computing device. At step 580, a request is received for option description information. This can occur, for example, in response to a user intermediately selecting an option as described with respect to step 480 in FIG. 4.

At step 582, the option description information is sent to the client computing device. Option description information can be acquired, for example, by the wiki server along with the list of options for a particular resource object type or in response to specific request from the client computing device.

At step 583, a request for link data is received for a selected option. For example, the client computing device may request a URL for a particular option that has been selected by a user. At step 585, the link data for the selected option is sent to the client computing device. In other embodiments, the link data for all options is sent to the client when the list of options is sent to the client.

Next, it is determined if another request for a resource object type list or option list has been received. If it has, then the process returns to step 525 (if a resource object type list has been requested) or step 550 (if an option list has been requested). If not, the process continues until a request to save the content of the wiki page is received 590. In this example, when the content is received, the content includes a plain-text link inserted into the content of the wiki page. The link is converted 592 into a hyperlink, and the wiki page content is saved 595. In other embodiments, the link may be converted to a hyperlink by the client computing device upon insertion into the content or prior to sending the content to the wiki server to be saved.

Figure 6:
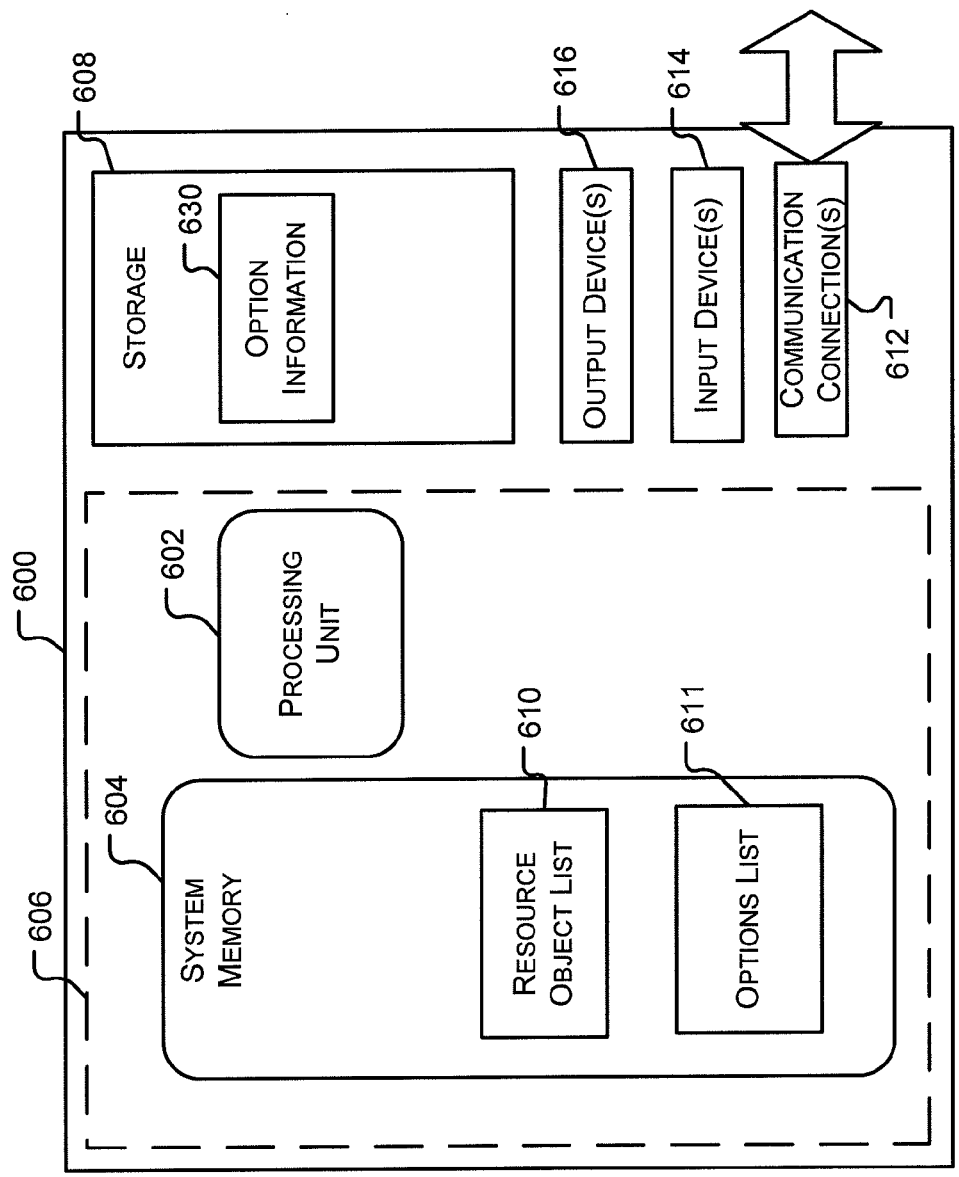
FIG. 6 illustrates a computing device that can be used to implement the embodiments described herein.

FIG. 6 illustrates a general computing device 600 (also referred to herein as a device, computer or computer system), which can be used to implement the embodiments described herein. The computing device 600 is only one example of a computing environment and is not intended to suggest any limitation as to the scope of use or functionality of the computer and network architectures. Neither should the computing device 600 be interpreted as having any dependency or requirement relating to any one or combination of components illustrated in the example computing device 600. In embodiments, computing device 600 may be used, for example, as client computing device 110, wiki server 105, administrator computing device 115, providers 120, etc., as described above with respect to FIG. 1.

In its most basic configuration, computing device 600 typically includes at least one processing unit 602 and memory 604. Depending on the exact configuration and type of computing device, memory 604 may be volatile (such as RAM), non-volatile (such as ROM, flash memory, etc.) or some combination of the two. This most basic configuration is illustrated in FIG. 6 by dashed line 606. System memory 604 stores applications that are executing on computing device 600. In addition to applications, memory 604 may also store information being used in operations being performed by computing device 600, such as a resource object list 610 and/or a options list 611, as described with respect to FIGS. 1-5B.

Additionally, computing device 600 may also have additional features/functionality. For example, computing device 600 may also include additional storage 606 (removable and/or non-removable) including, but not limited to, magnetic or optical disks or tape. Such additional storage is illustrated in FIG. 6 by storage 606. Computer storage media includes volatile and nonvolatile, removable and non-removable media implemented in any method or technology for storage of information such as computer readable instructions, data structures, program modules or other data. Memory 604 and storage 606 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 600. Any such computer storage media may be part of computing device 600.

As those with skill in the art will appreciate, storage 606 may store a variety of information. Among other types of information, storage 606 may store option information 630. Computing device 600 may also contain communications connection(s) 612 that allow the system to communicate with other devices. Communications connection(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Computing device 600 may also have input device(s) 614 such as keyboard, mouse, pen, voice input device, touch input device, etc. Output device(s) 616 such as a display, speakers, printer, etc. may also be included. All these devices are well know in the art and need not be discussed at length here.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A method for providing autocompletion of a link to a resource in a wiki-editor user interface, comprising the following steps:
    receiving content for a wiki page via the wiki-editor user interface at a client computing device;
    receiving, via the wiki-editor user interface, an indication that a user desires to link to a resource;
    receiving a list of a plurality of resource object types available for linking from the wiki page, the resource object types comprising one or more categories of wiki resources and maintained in a registration document further including contact information for a provider associated with each of the resource object types;
    displaying the list of resource object types;
    receiving a selection of one of the resource object types;
    receiving a list of options for the selected resource object type by accessing the registration document, obtaining the contact information for the provider of the selected resource object type, and requesting the list options from the provider, wherein the list of options comprises different resources of the selected resource object type that are available for linking from the wiki page;
    displaying the list of options for the selected resource object type;
    receiving first input text;
    acquiring a filtered list of options that contains only options for the selected resource object type that include the first input text;
    receiving the filtered list of options;
    receiving a selection of one of the filtered options; and
    inserting a link to the selected filtered option into the content.

2. The method of claim 1, wherein receiving the indication that the user desires to link to the resource comprises detecting that the user has input link-initiating text in the content received in the wiki-editor user interface.

3. The method of claim 1, wherein displaying the list of resource object types further comprises displaying a list of options for a first of the resource object types and wherein receiving the selection of the one of the resource object types comprises receiving the selection of a second of the resource object types.

4. The method of claim 3, wherein the first of the resource object types is automatically selected.

5. The method of claim 1, further comprising, after receiving the list of resource object types:
    receiving an indication that autocompletion of the link is desired.

6. The method of claim 5, wherein the indication that autocompletion of the link is desired comprises a detection of a pause by the user after inputting the first input text.

7. The method of claim 5, wherein the indication that autocompletion of the link is desired comprises detection of a threshold number of characters of the first input text being entered.

8. The method of claim 1, further comprising, after receiving the indication that the user desires to link to the resource:
    providing a link-text entry area in the wiki-editor user interface;
    wherein the first input text is received in the link-text entry area, and the list of resource object types, the list of options, and the filtered list of options are displayed in menus within the wiki-editor user interface.

9. A computer storage medium including instructions that, when executed by at least one processing unit, perform the following method:
    providing a registration document, wherein the registration document maintains at least a first registered resource object type and includes first contact information for a first provider of the first registered resource object type;
    receiving a registration of a second resource object type, wherein the registration of the second resource object type includes second contact information for a second provider of the second resource object type;
    editing the registration document to include the second registered resource object type and the second contact information for the second provider;
    receiving a request from a first wiki editor hosted by a first client computing device for a list of registered resource object types, wherein the resource object types comprise categories of wiki resources;
    sending to the first client computing device the list of resource object types including the first registered resource object type and the second registered resource object type;
    receiving a request for a list of options for the second registered resource object type;
    requesting the list of options for the second registered resource object type by accessing the registration document, obtaining the contact information for the provider of the second resource object type, and requesting the list options from the provider;
    sending to the first client computing device the list of options for the second resource object type;
    receiving first input text;
    acquiring a filtered list of options that contains only options for the second resource object type that include the first input text;
    receiving the filtered list of options;
    receiving a selection of one of the filtered options; and
    inserting a link to the selected filtered option in the text content.

10. The computer storage medium of claim 9, wherein the registration document comprises an extensible markup language (XML) document, the second provider comprises a SOAP service, and the second contact information includes instructions for querying the SOAP service for valid options of the second resource object type.

11. The computer storage medium of claim 9, wherein the first provider and the second provider comprise web servers hosted on different computing devices.

12. The computer storage medium of claim 9, wherein inserting a link to the selected filtered option in the text content comprises inserting a uniform resource locator (URL) for the selected filtered option.

13. The computer storage medium of claim 9, wherein the method further comprises the steps of, after requesting the list of options for the second registered resource object type:
- receiving the list of options for the second registered resource object type from the second provider;
- determining that the list of options exceeds a threshold; and
- indicating to the first client computing device that additional information regarding a desired option is needed.

14. A system for providing autocompletion of a link to a resource in a wiki-editor user interface, comprising:
- at least one processing unit;
- at least one memory, including instructions that when executed by the at least one processing unit cause the at least one processing unit to perform a method comprising:
  - receiving text content for a wiki page via the wiki-editor user interface;
  - receiving, via the wiki-editor user interface, an indication that a user desires to link to a resource;
  - receiving a list of a plurality of resource object types available for linking from the wiki page, the resource object types comprising one or more categories of wiki resources and maintained in a registration document further including contact information for a provider associated with each of the resource object types;
  - displaying the list of resource object types;
  - receiving a selection of one of the resource object types;
  - receiving a list of options for the selected resource object type by accessing the registration document, obtaining the contact information for the provider of the selected resource object type, and requesting the list options from the provider, wherein the list of options comprises different resources of the selected resource object type that are available for linking from the wiki page;
  - displaying the list of options for the selected resource object type;
  - receiving first input text;
  - acquiring a filtered list of options that contains only options for the selected resource object type that include the first input text;
  - receiving the filtered list of options;
  - receiving a selection of one of the filtered options;
  - inserting a link to the selected filtered option in the text content.

15. The system of claim 14, further comprising, after receiving the list of resource object types:
- receiving second input text;
- requesting a filtered list of resource object types that contains only resource object types that include the second input text;
- displaying the filtered list of resource object types;
- wherein receiving the selection of the one of the resource object types comprises receiving the selection of one of the resource object types from the filtered list of resource object types.

16. The system of claim 14, further comprising, after receiving the indication that the user desires to link to the resource:
- providing a link-text entry area in the wiki-editor user interface;
- wherein the first input text is received in the link-text entry area, and the list of resource object types, the list of options, and the filtered list of options are displayed in menus within the wiki-editor user interface.

17. The system of claim 14, wherein receiving the indication that the user desires to link to the resource comprises detecting that the user has input link-initiating text in the text content received in the wiki-editor user interface.

* * * * *